(12) United States Patent
Scrivano et al.

(10) Patent No.: US 9,064,227 B2
(45) Date of Patent: Jun. 23, 2015

(54) DIGITAL MENU BOARD SYSTEM WITH CASH REGISTER AND KITCHEN INTERFACE

(75) Inventors: David Scrivano, South Lyon, MI (US); David Strother, Farmington Hills, MI (US); Cathryn Fritz-Jung, Grosse Pointe Farms, MI (US); Amanda B. Thomas, Livonia, MI (US); Bryan Durren, Beverly Hills, MI (US); Christopher P. Ilitch, Bloomfield Hills, MI (US)

(73) Assignee: Little Caesar Enterprises, Inc.

( * ) Notice: Subject to any disclaimer, the term of this patent is extended or adjusted under 35 U.S.C. 154(b) by 18 days.

(21) Appl. No.: 12/765,067

(22) Filed: Apr. 22, 2010

(65) Prior Publication Data
US 2010/0274633 A1 Oct. 28, 2010

Related U.S. Application Data

(60) Provisional application No. 61/172,399, filed on Apr. 24, 2009.

(51) Int. Cl.
*G06Q 10/08* (2012.01)
*G06Q 10/06* (2012.01)
(Continued)

(52) U.S. Cl.
CPC ............ *G06Q 10/087* (2013.01); *G06Q 10/063* (2013.01); *G06Q 30/0268* (2013.01); *G06Q 30/06* (2013.01); *G06Q 50/12* (2013.01)

(58) Field of Classification Search
CPC G06Q 10/087; G06Q 10/063; G06Q 30/0268
USPC ..................................................... 705/28, 15
See application file for complete search history.

(56) References Cited

U.S. PATENT DOCUMENTS

| 4,388,689 A | 6/1983 | Hayman et al. |
| 4,530,067 A | 7/1985 | Dorr |

(Continued)

FOREIGN PATENT DOCUMENTS

| WO | WO 02/23427 | * 3/2002 | ............. G06F 17/60 |
| WO | WO-02/23427 A2 | 3/2002 | |

OTHER PUBLICATIONS

Ramanathan, Ramakrishnan; "Stocking and Discounting Decisions for Perishable Commodities Using Expected Profit Approach"; International Journal of Retail & Distribution Management; Bradford: 2006, vol. 34, Iss. 2/3; p. 172, 13 pgs.*

(Continued)

*Primary Examiner* — Shay S Glass
(74) *Attorney, Agent, or Firm* — Honigman Miller Schwartz and Cohn LLP

(57) ABSTRACT

A product management and sales system for managing product preparation and sales. The system includes a kitchen display and input device displaying a plurality of perishable food items to be produced and receiving a production indication signal indicating production of at least one of the plurality of perishable food items. The system further includes a digital menu board displaying the plurality of perishable food items available for sale, a sales counter terminal for completing a sale of at least one of the plurality of perishable food items and outputting a sold indication signal; and a controller receiving the sold indication signal. The controller compares the sold indication signal to a predetermined inventory level for the at least one perishable food item and outputs an item-to-be-produced signal to the kitchen display and input.

5 Claims, 8 Drawing Sheets

(51) Int. Cl.
  *G06Q 30/02* (2012.01)
  *G06Q 30/06* (2012.01)
  *G06Q 50/12* (2012.01)

(56) References Cited

U.S. PATENT DOCUMENTS

| | | | |
|---|---|---|---|
| 5,671,362 A * | 9/1997 | Cowe et al. | 705/28 |
| 6,026,372 A * | 2/2000 | Savage | 705/15 |
| 6,052,667 A | 4/2000 | Walker et al. | |
| 6,298,331 B1 | 10/2001 | Walker et al. | |
| 6,327,576 B1 | 12/2001 | Ogasawara | |
| 6,801,228 B2 | 10/2004 | Kargman | |
| 6,901,381 B2 | 5/2005 | Brown et al. | |
| 7,137,529 B2 * | 11/2006 | Martinelli et al. | 221/150 R |
| 7,184,990 B2 | 2/2007 | Walker et al. | |
| 7,232,062 B1 | 6/2007 | Salerno | |
| 7,951,409 B2 * | 5/2011 | Parker | 426/231 |
| 2003/0055727 A1 | 3/2003 | Walker et al. | |
| 2003/0120561 A1 | 6/2003 | Asada | |
| 2004/0133475 A1 | 7/2004 | Kargman | |
| 2005/0021407 A1 * | 1/2005 | Kargman | 705/15 |
| 2005/0038719 A1 | 2/2005 | Young et al. | |
| 2006/0218057 A1 | 9/2006 | Fitzpatrick et al. | |
| 2006/0235755 A1 | 10/2006 | Mueller et al. | |
| 2007/0214053 A1 | 9/2007 | Salerno | |
| 2007/0251521 A1 | 11/2007 | Schackmuth et al. | |
| 2008/0162276 A1 | 7/2008 | Nguyen et al. | |

OTHER PUBLICATIONS

Mexican Office Action for Application No. Mx/a/2011/011172 dated May 12, 2014.
Mexican Office Action for Application No. Mx/a/2011/011172 dated Jul. 19, 2013 with its English translation thereof.

* cited by examiner

Fig-3

| SUNDAY | MONDAY | TUESDAY | WEDNESDAY | THURSDAY | FRIDAY | SATURDAY |

BUILD - TO ITEMS | NON - BUILD - TO ITEMS

MONDAY

CORE ITEMS

| HOURS | PEPPERONI | CRAZY BREAD | ITALIAN CHEESE BREAD | CAESAR WINGS BUFFALO |
|---|---|---|---|---|
| 11 TO 12 | 3 | 4 | 2 | 2 |
| 12 TO 1 | 3 | 6 | 5 | 4 |
| 1 TO 2 | 3 | 4 | 3 | 3 |
| 2 TO 3 | 4 | 4 | 2 | 2 |
| 3 TO 4 | 5 | 2 | 2 | 2 |
| 4 TO 5 | 7 | 4 | 5 | 4 |
| 5 TO 6 | 9 | 8 | 9 | 7 |
| 6 TO 7 | 8 | 12 | 10 | 7 |
| 7 TO 8 | 5 | 12 | 9 | 8 |
| 8 TO 9 | 4 | 8 | 8 | 4 |
| 9 TO 10 | 3 | 4 | 7 | 2 |
| 10 TO 11 | 2 | 4 | 2 | 1 |
| 11 TO 12 | 2 | 4 | 2 | 1 |

OPTIONAL ITEMS

| OPTION 1 12" M. ULT. S ▽ | OPTION 2 CHURROS ▽ | OPTION 3 SELECT ONE... ▽ | OPTION 4 SELECT ONE... ▽ | ... | OPTION 8 SELECT ONE... ▽ |
|---|---|---|---|---|---|
| 0 | 0 | | | | ☐ |
| 0 | 0 | | | | ☐ |
| 0 | 4 | | | | ☐ |
| 4 | 4 | | | | ☐ |
| 5 | 2 | | | | ☐ |
| 7 | 4 | | | | ☐ |
| 9 | 8 | | | | ☐ |
| 8 | 12 | | | | ☐ |
| 5 | 12 | | | | ☐ |
| 4 | 8 | | | | ☐ |
| 0 | 4 | | | | ☐ |
| 0 | 0 | | | | ☐ |
| 0 | 0 | | | | ☐ |

OPTIONAL PIZZA :
12" MEDIUM ULTIMATE SUPREME
12" MEDIUM THREE MEAT TREAT
12" MEDIUM VEGGIE
12" MEDIUM HULA HAWAIIAN
12" MEDIUM ....
14" LARGE ULTIMATE SUPREME
14" LARGE THREE MEAT TREAT
14" LARGE VEGGIE
14" LARGE HULA HAWAIIAN
14" LARGE ....
OPTIONAL SIDE ITEMS :
ZESTY JALAPENO CHEESE BREAD
PEPPERONI CHEESE BREAD 16 PC.
PEPPERONI CHEESE BREAD 10 PC.
CAESAR WINGS BBQ
CAESAR WINGS OVEN ROASTED
BBQ RIB SMACKERS
CHURROS
CHURROS W/ DIPS
BUNDLE :

SAVE

| | | | | | |
|---|---|---|---|---|---|
| PEPPERONI PIZZA HOT-N-READY | TARGET ACTUAL PENDING | 48 47 6 | REMOVE 1 ⊖ | ADD 1 ⊕ | WASTE |
| CHEESE PIZZA HOT-N-READY | TARGET ACTUAL PENDING | 22 12 3 | REMOVE 1 ⊖ | ADD 1 ⊕ | WASTE |
| CRAZY BREAD | TARGET ACTUAL PENDING | 28 32 8 | REMOVE 1 ⊖ | ADD 1 ⊕ | WASTE |
| ITALIAN CHEESE BREAD | TARGET ACTUAL PENDING | 12 14 0 | REMOVE 1 ⊖ | ADD 1 ⊕ | WASTE |
| ULTIMATE SUPREME PIZZA | TARGET ACTUAL PENDING | 6 3 3 | REMOVE 1 ⊖ | ADD 1 ⊕ | WASTE |
| BABY PAN! PAN! | TARGET ACTUAL PENDING | 9 10 3 | REMOVE 1 ⊖ | ADD 1 ⊕ | WASTE |

*Fig-4*

DIGITAL MENU BOARD SYSTEM WITH CASH REGISTER AND KITCHEN INTERFACE

CROSS-REFERENCE TO RELATED APPLICATIONS

This application claims the benefit of U.S. Provisional Application No. 61/172,399, filed on Apr. 24, 2010. The entire disclosure of the above application is incorporated herein by reference.

FIELD

The present disclosure relates to a retail food sale device and, more particularly, relates to a digital menu board having a cash register and/or kitchen interface system.

BACKGROUND AND SUMMARY

This section provides background information related to the present disclosure which is not necessarily prior art. This section further provides a general summary of the disclosure, and is not a comprehensive disclosure of its full scope or all of its features.

It has become increasing popular in the retail food sales business to offer food products for sale that are immediately ready for customer pickup without the conventionally required preparation time between the time of ordering and availability. Although these principles can be used in a wide range of specific businesses, one particular program hosted by Little Caesars Enterprises, Inc. (LCE) is its Hot-N-Ready® concept that enables stores to provide always hot and always ready products without any wait time. This speed of service coupled with an extreme value proposition for its products had enabled LCE to continue its growth over the years unabated.

In its core operations, Pepperoni Pizza and Cheese Pizza currently are considered the staple of the Hot-N-Ready® product line up, and they contribute to majority of sales revenue for the chain. Each individual store is also allowed to carry a subset of products based on local market demand. Prices for each store can be set by store managers based on local market conditions to ensure maximum competitiveness.

Although LCE is very successful with its current method of operation, a project to further enhance and streamline store operations was initiated by LCE in order to further improve business efficiency. In this regard, LCE developed the present teachings to streamline store operations by having the ability to better promote specialty products, reduce waste, ensure Hot-N-Ready® availability and product quality, and enhance speed of transactions for customer-facing services.

These improvement goals are meant to empower stores to operate more efficiently than ever before, reduce staff training, overcome staff turnover concerns, enhance product availability and quality control process, become more competitive, increase same ticket spending, and at the same time enhance customer awareness of the variety of products offered by LCE rather than just one or two selected products.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a schematic view of a daily To-Be-Made screen for entering a desired To-Be-Made listing;

FIG. 4 is a schematic view of an available product inventory screen;

Corresponding reference numerals indicate corresponding parts throughout the several views of the drawings.

DETAILED DESCRIPTION

Example embodiments will now be described more fully with reference to the accompanying drawings. For ease of discussion, the present teachings are provided as sections in the present application, such as an overview of current operations, vision and scope, assumptions and dependencies, features and functionalities, user classes, use case scenarios, point of sale integration protocols, and digital menu board integration protocols. However, these sections should not be regarded as limiting in any way.

It should be understood that although example embodiments are provided in detail, such as examples of specific components, devices, and methods, it will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Finally, the present teachings will be described in connection with the business operations of the assignee and specifically in connection with the preparation and sale of pizza products and the like. However, it should be understood that the present teachings could be employed in connection with any product that is intended to be readily available to an on-demand purchaser and can include any one of a number of food or non-food products.

General Overview

Figure 1:
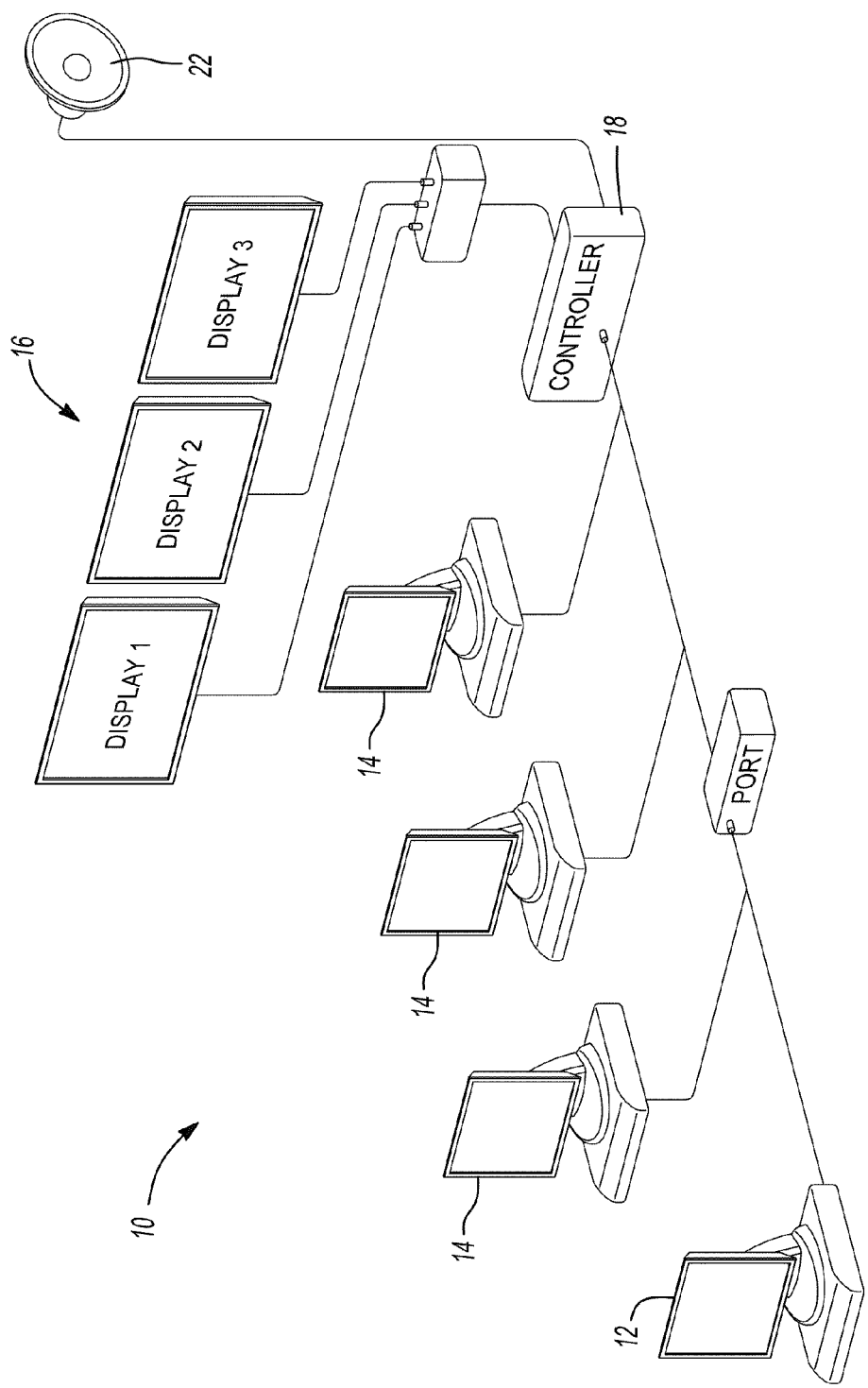
FIG. 1 is a schematic view of a product system according to a first embodiment of the present teachings.
Figure 2:
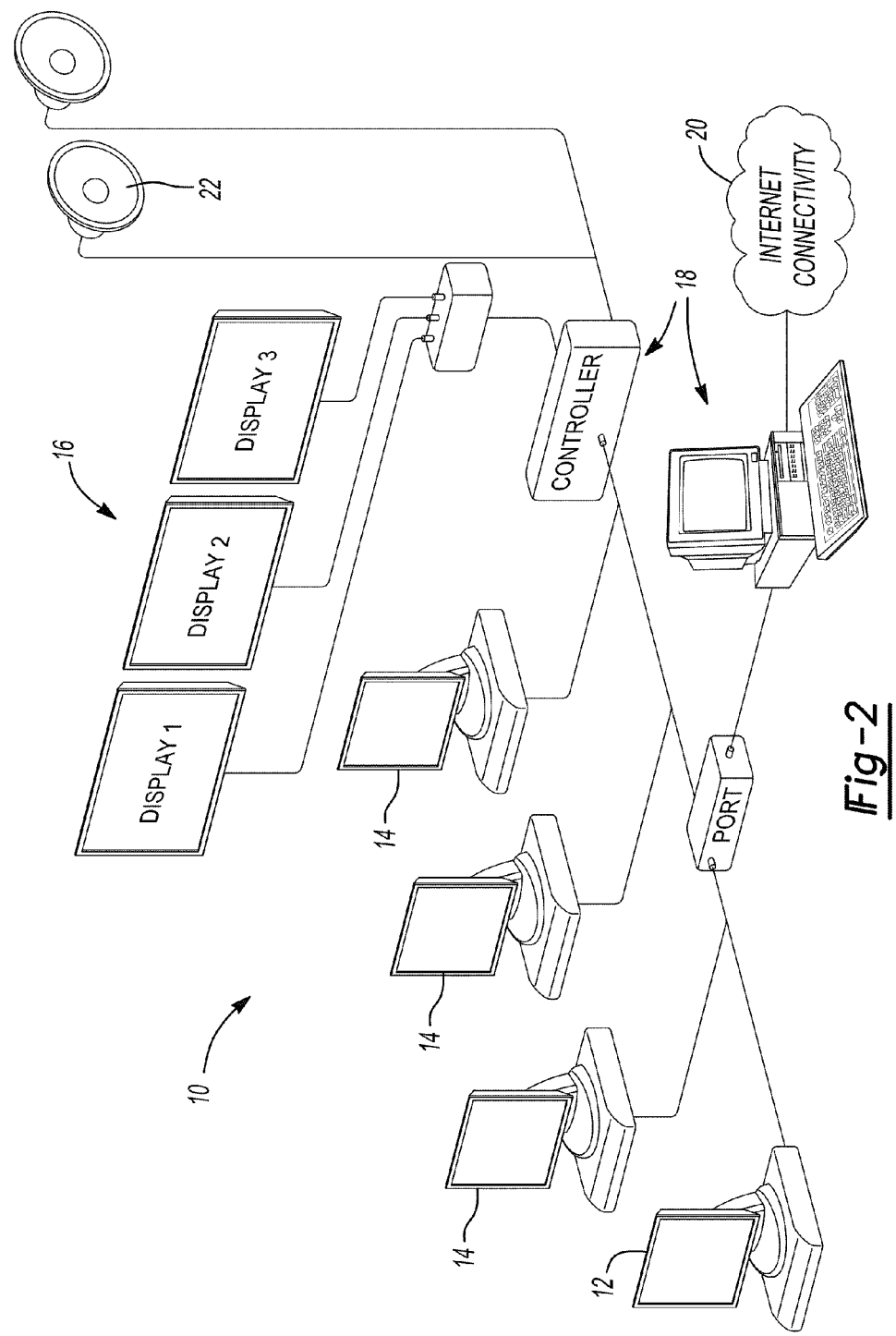
FIG. 2 is a schematic view of a product system according to a first embodiment of the present teachings.

According to the principles of the present teachings, as illustrated in FIGS. 1 and 2, a product management and sales system 10 (product system 10) is provided that interfaces with a food preparation display system 12, a point-of-sale software and register system 14 (point-of-sale system 14), a digital menu board system 16 and a control system 18 to aid the kitchen in producing the targeted amount of To-Be-Made items and controls the content of digital menu board system 16. In some embodiments, food preparation display system 12 can comprise control system 18 as an integral system. In some embodiments, product system 10 can comprise internet connectivity 20 (FIG. 2) and/or audible output 22 (FIGS. 1 and 2). Additionally, in some embodiments, control system 18 can be incorporated into any one of the other components of system 10 to minimize space and/or complexity. Furthermore, in some embodiments, a keyboard (FIG. 2) can be used for manual entry of data and/or information into product system 10.

Generally, store management sets the daily To-Be-Made items list. The purpose of the To-Be-Made list is to indicate to staff what Hot-N-Ready® food items are to be available at any given hour. To-Be-Made list items and target production levels are displayed on food preparation display system 12 adjacent a food preparation area. In some embodiments, a touch screen LCD can be used by kitchen staff to see how many To-Be-Made items are in inventory as well as to interface with the product system 10 to input food item levels as they are created.

In some embodiments, the digital menu board system 16 can control the content seen on the digital menu board. Content is relevant to management input via the To-Be-Made application and real-time inventory levels controlled by the cash register/point-of-sale terminal and the kitchen interface.

To-Be-Made List

Generally, the To-Be-Made System serves two functions. It will set the targets for production levels used by the kitchen staff and it will determine which products display in the "Optional" and "Pizza Options" Zones on the digital menu board. These two components are integrated and designed so that when a finished product's inventory is 1 or greater, its corresponding digital menu graphic is "on" and when a finished product's inventory is zero or lower, its corresponding menu graphic is "off". In addition, store management will have the flexibility of activating menu items for display on the digital menu board.

In some embodiments, the "To-Be-Made" list is a software application that is utilized to determine the "Target" inventory for Core and Optional food items per hour and/or per day, as illustrated in FIG. 3. Utilizing a user interface, such as a mouse and keyboard (or touch screen), a local manager will click the "To-Be-Made" icon that resides on the local LCE desktop. Password protection can be integrated as a means to allow authorized personnel only into the product system 10 and the To-Be-Made application. Successful access into the To-Be-Made application will default to a custom Graphical User Interface (GUI), where the manager can easily add "target" inventory numbers to all Core and Optional food items, per hour, per day.

The inventory of each To-Be-Made product is directly determined by the actions of both kitchen personnel and counter personnel. As finished food products are prepared, their inventory level increases with kitchen personnel manually adding to the tally using a wall-mounted touch screen and GUI to interface with the product system 10. As finished food products are sold, counter personnel decrease their inventory level with normal cash register/point-of-sale terminal operation. The product system 10 will interact with the cash register/point-of-sale terminal dynamically in real time. It should be understood that inventory levels can be automatically tallied using bar code, RFID, or other system. Moreover, specific product items can be tracked using such bar code, RFID, or other system to discretely identify individual product that is to be made, cook, warmed, sold, removed, or the like from inventory. This system can be especially useful in promoting an individual item for sale (i.e. a unique product having unique toppings) and/or identifying the individual item for removal from inventory due to various food item criteria.

At the kitchen display 12, kitchen personnel will see target inventory levels to assist with maintaining the actual inventory level. Color-coding of Green, Yellow and Red around the actual inventory number will serve as a visual cue for staff to aid in proper production levels. In some embodiments, when the actual inventory level is equal to or within one unit of the target (To-Be-Made) inventory, a green background is automatically illustrated; when the difference is 2 units, a yellow background is illustrated and when the difference is 3 or more units a red background is illustrated. This color-coding will be relevant to the accumulated sum of both actual and pending items.

Adding Inventory

With reference to FIG. 4, in some embodiments, located in the kitchen at a close proximity to the oven is touch screen kitchen display 12 that will illustrate rows of To-Be-Made food items. Each row can include an image of the food item, the food item name, and an "Add 1" and "Remove 1" touchbuttons. In some embodiments, only rows or food items that have been tagged with "target inventory levels" via the To-Be-Made application will be displayed on the kitchen display 12.

Kitchen personnel will be able to see each food item's "target" inventory level. As food is being prepared (i.e., pizza's put in the oven), they will touch the "Add 1" button repeatedly until it matches the number of items being prepared. For instance, when two pepperoni pizzas are put in the oven, they will touch the "Add 1" button two times. The two pepperoni pizzas will be added to the "pending" total. After a predetermined amount of time (which is a number defined for each category of food), the pending inventory can automatically move from pending to actual; therefore enabling the corresponding menu graphics to be timed or synchronized with food preparation. If a mistake is made, Kitchen personnel can remove pending inventory by touching the "Remove 1" button. In some embodiments, a waste button can be used to denote wasted items.

In some situations, the actual number can show as negative. A negative actual number in the kitchen would indicate the item is sold and pending. As the X-minute delay transpires, the actual number may, in some cases, rise under the assumption that the product was given to the customer in waiting.

Reducing Actual & Target Inventory

Counter personnel will reduce the actual inventory level through normal operation of the cash register/point-of-sale terminal 14. As food items are sold, the cash register/point-of-sale terminal 14 will record the transaction. The data of the sale will be automatically written to the product system 10 database where quantity and individual item identification can be queried.

Digital Menu Board System

In some embodiments, the digital menu board system 16 comprises a plurality of High Definition LCD displays or other display device, mounted side by side. Each display can be divided into one or more zones. There is no limit to the number of zones a display can be divided; however, a strategic approach will include consistent zones aspect ratios therefore enable efficient content management practices. Finished food product graphics, animations and/or videos will be assigned to one or more specific zones. Other types of content (i.e., non-finished food products) can also be integrated into the menu board in one or more zones; such as TV commercials promoting the quality of the products. Because of the dynamic quality of the digital menu board system 16 design, it is important that content and zoning standard is initially developed and maintained throughout the process.

Figure 5:
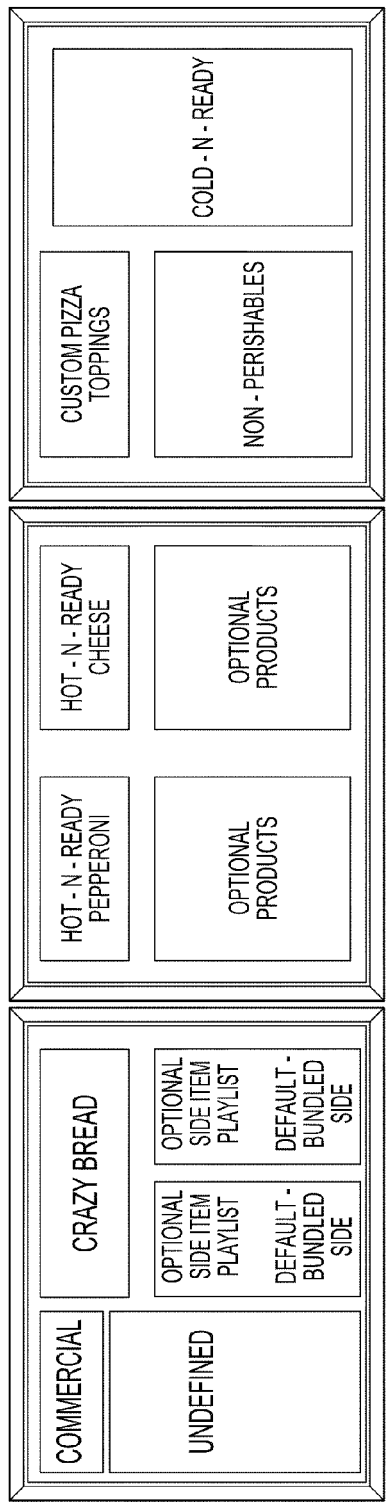
FIG. 5 is a schematic view of a Menu Board layout.

In some embodiments, a single Media Player can drive all the menu board content. The layout can be divided into a number of zones. Currently, as seen in FIG. 5, there are 12 zones that consist of the following from left to right across the menu board: Commercial (To display existing 4:3 ratio TV commercials); Undefined—flex space; Crazy Bread®, Option Side 1 (Default is to show a Bundled Side); Optional Side 2 (Default is to show a Bundled Side); Hot-N-Ready® Pepperoni; Hot-N-Ready® Cheese; Optional Pizza 1 (Default is to show a Pizza Bundle); Optional Pizza 2 (Default is to show a Pizza Bundle); Custom Pizza Toppings; Shelf Stable Items; Cold-N-Ready Items.

Managing Menu Items—Automated

In some embodiments, the control system 18 can read the inventory levels of all To-Be-Made products and display or play all content that has an inventory level of 1 or greater. In some embodiments, the core product of Crazy Bread®, Hot-N-Ready® Pepperoni and Hot-N-Ready® Cheese will always be displayed. Any build to products with an inventory level of zero will not be displayed on the digital menu board system 16; rather a default graphic, animation or video will be displayed in its place or, in some embodiment, other product offers can be displayed.

Managing Menu Items—Manual

Figure 6:
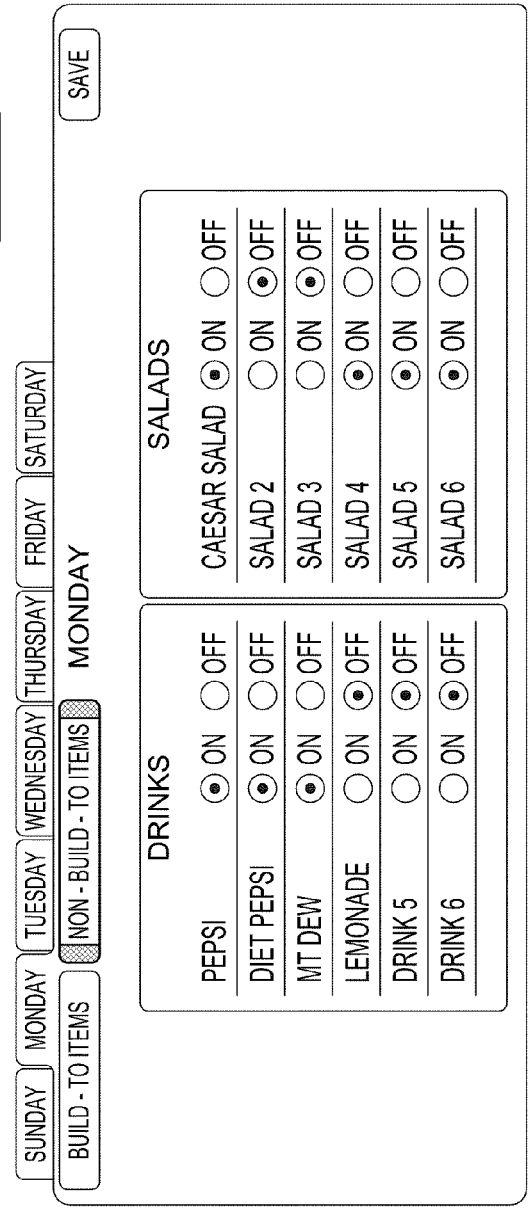
FIG. 6 is a schematic view of a non-To-Be-Made screen for activating promotion on the Menu Board.
Figure 7A:
FIGS. 7A-7F are screen captures of potential menu board display layouts dynamically promoting specific menu items.
Figure 7B:
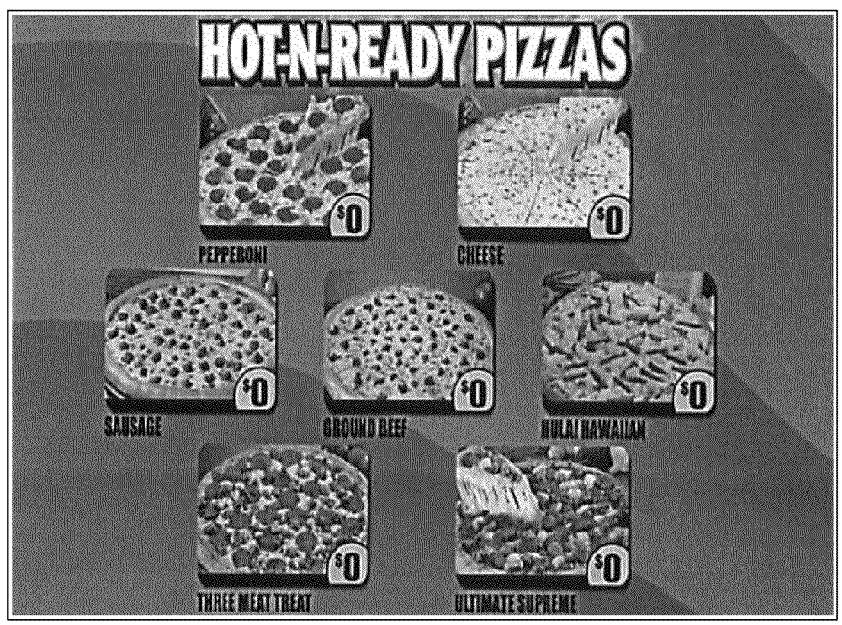
Figure 7C:
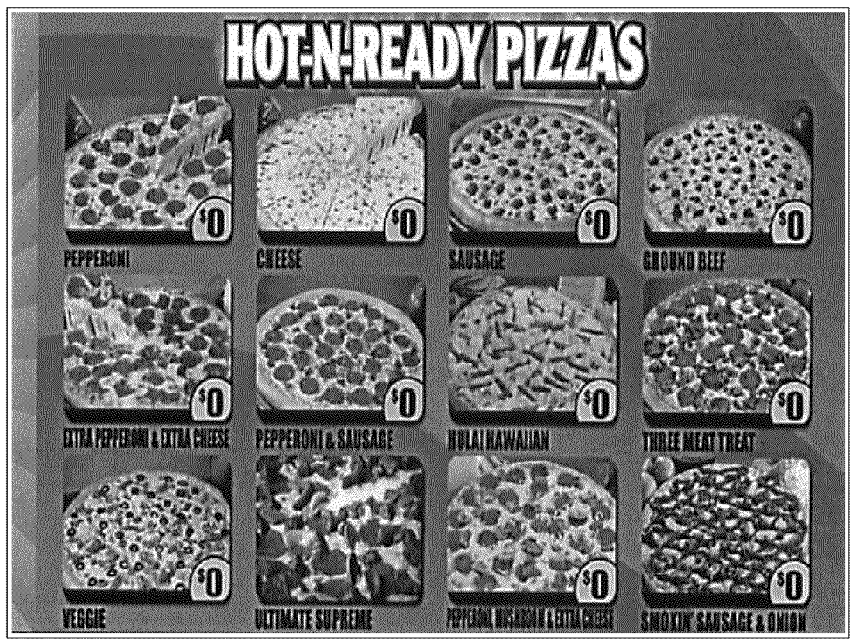
Figure 7D:
Figure 7E:
Figure 7F:

In some embodiments, the To-Be-Made application will automatically control a portion of the digital menu board system 16, as described herein. However, the digital menu board system 16 will also need to display items that are not relative to the To-Be-Made list. (e.g. Cold-N-Ready or "Shelf Stable" items). For these items, a simple On or Off button will be utilized within the product system 10 to enable an item to be shown on the digital menu board system 16 as illustrated in FIG. 6.

Price:

In some embodiments, pricing can be manually or dynamically controlled based on any one of a plurality of parameters, such as promotional programs, timing, demand, and the like.

Product Management and Sales System

The product management and sales system ("product system 10") can be used to automate as many work processes as possible so that the primary objectives as discussed herein can be achieved. The core component of the present disclosure, the food preparation display system 12, point-of-sale system 14, and the digital menu board system 16 will now be discussed. The following is a listing of attributes associated with the principles of the present teachings:

At the outset, it should be appreciated that several benefits are realized in connection with the principles of the present teachings. Specifically, increased staff productivity can be achieved by having the food preparation display system 12 alert kitchen staff regarding production/availability/quality assurance, while the point-of-sale system 14 at the front of the store allows the store clerks to complete transactions faster. Reduced new staff training time can also be achieved by having the food preparation display system 12 automate the monitoring process so that the staff will be alerted of events to handle rather than having to learn the various details that might take days or weeks to be ready. Moreover, the present teachings improves forecast accuracy by product types by having the food preparation display system 12 automate the forecasting and remainder balance calculation so that the staff can focus on the exact product to make instead of having to also guess the production count as well.

The present teachings further ensure that product, such as Hot-N-Ready® Products, is always available by having the food preparation display system 12 actively monitor the current availability from ready rack to the warmers, and automatically formulate the production needed for the current time block so that products are always available and always fresh. The present teachings further ensure consistent product quality by having the food preparation display system 12 actively monitor the current products' expiration time and alert kitchen staff when such expirations do occur. This frees the kitchen staff from having to constantly monitor the expirations manually and allow them to focus on other core duties. Moreover, the ability to identify promo opportunities can be achieved by having the food preparation display system 12 actively monitor product excess threshold as well as expiration time threshold, so that when there are products that might need more attention on the digital menu board system 16 (to notify customer of availability), the food preparation display system 12 would be able to send such triggers. This in effect helps the store to alert customers of certain availabilities and thus potentially reduce non-saleable items.

The principles of the present teaching further provide the ability to identify product shortage gap by having the food preparation display system 12 actively monitor inbound point-of-sale system 14 sales transactions so that special products or Hot-N-Ready® products under produced can be reported as shortage in report, so that store manager may decide to either include such special products as Hot-N-Ready® going forward or increase the existing Hot-N-Ready® product's production quantity in the future.

The principles of the present teaching further provide the potential for increased same ticket customer transaction spending by having the food preparation display system 12 working with the digital menu board system 16 to present attracting promos and product notifications so that up-sale opportunity as well as impulse spending habits could be generated. Since the product system 10 enables the stores the ability to promote more specialty products via digital menu board system 16, it would be more likely for customers to try new and exciting products along with their old time favorites. This not only helps increase same ticket spending but also help move products through inventory and enhance product quality.

Reduced product non-saleable quality, waste, and overages can be achieved by having the point-of-sale system 14, food preparation display system 12 and digital menu board system 16 working together so that loss (whether monetary or product) could be reduced since the point-of-sale system 14 can hold store clerks accountable to the point-of-sale system 14 transactions, the food preparation display system 12 can automate the work process to eliminate human errors, and the digital menu board system 16 participates by pushing the available product information to the customers so that existing inventory of ready products can be fulfilled faster. That is, waste (and non-saleable quality or overages) are inevitable for precooked product scenarios; however the product system 10 would help to reduce this significantly because of near real time promotion of specialty products and products near expiration; as well as more precise understanding of historical product sales in order to achieve a more realistic projection for the current business date. The food preparation display system 12 itself also contains provision to closely monitor product quality and count down so that the kitchen staff would only make just the right amount of the products to be placed into the holding warmers, thus helping to reduce waste in general.

The promotion of more specialty products can be achieved by having the food preparation display system 12 and digital menu board system 16 working together to showcase the available specialty products currently Hot-N-Ready®. Since the production of specialty products might be based on past forecasts, waste might be reduced significantly since the store will understand its local market conditions much better. That is, the point-of-sale system 14, food preparation display system 12, and digital menu board system 16 work together to create meaningful projections based on historical product mix sales history so that special opportunities could be identified and acted upon by store managers. Available products (whether specialty or standard) are immediately reflected onto the digital menu board system 16 via digital menu board system 16 and food preparation display system 12 integration. No longer would the store clerk be responsible to manually check product availability and then update the static menu board. When certain specialty products need to be promoted based on threshold level toggles, the food preparation display system 12 and digital menu board system 16 would work together to synchronize such events so that proper promotion triggers can be executed and reflected immediately on digital menu board system 16, alerting customers to take immediate actions.

The food preparation display system 12 would contain specialized algorithm to help kitchen staff better identify what products to produce in the current time block. The food preparation display system 12 takes into account the currently available products already in the holding warmer and products that might be expiring soon, such formula not only help maintain product availability but also ensure product quality consistency since kitchen staff are alerted to produce more products only when necessary.

The point-of-sale system 14 and digital menu board system 16 can work together to achieve streamlined and faster customer transactions. The digital menu board system 16 immediately conveys to the customer the most accurate and real time product availability information to the customer, helping the customer decide their desired products to order when they arrive to the front of the counter line. The point-of-sale system 14 enables the store clerk to quickly input customer order and reflect such order details to the food preparation display system 12 in order to maintain the most accurate product availability in both the holding warmers as well as the digital menu board system 16.

In some embodiments, the point-of-sale system 14, digital menu board system 16 and food preparation display system 12 are all deployed at the same store location and interconnected via Local Area Network (LAN) and all three systems are able to communicate with each other via standard IP based communication protocols.

In some embodiments, the point-of-sale system 14 is touch operated and is user intuitive for even non-computer experienced users. The digital menu board system 16 presents alluring product promotions and availability and is specifically designed to capture customers' attention. The food preparation display system 12 is designed as touch operated and intuitive for noncomputer experienced users.

In some embodiments, in order to achieve these goals, key technologies would work together cohesively at the stores so that efficiency and ease of operations could be maximized. The product system 10 would be composed of the digital menu board system 16; the point-of-sale system 14; and the food preparation display system 12. Each of these three systems work in unity to achieve a seamless integration effort for the purpose of meeting the visions and scope described above.

The following describes an exemplary store based system of product system 10:

The Digital Menu Board System

The digital menu board system 16 provides alluring media presentation about product availability and promotions for customers to view and can be deployed at the front of the house (typically above the customer service counter). In some embodiments, each store has at least one digital menu board system 16 installed.

The Point-Of-Sale System

The point-of-sale system 14 helps stores streamline and speed up customer transactions and further seamlessly integrates with the food preparation display system 12. In some embodiments, the purpose of point-of-sale system 14 is to input customer transactions and deliver transaction information to the food preparation display system 12 for kitchen management, as well as provide other modern point of sale system functionalities designed to help maximize store management. In some embodiments, each store will have one or more of the point-of-sale system 14 installed The Food Preparation Display System The food preparation display system 12 seamlessly integrates with the point-of-sale system 14 and digital menu board system 16 and is typically located near the end of the food prep area. The food preparation display system 12 can essentially act as the central point of the product system 10 as it is responsible for maintaining product mix sales history, product availability and quality assurance, non-saleable quality, waste and overage tracking, as well as serving as the bridge points between point-of-sale system 14 and digital menu board system 16. Each store will have at least one food preparation display system 12 installed.

Features and Operation

The following are the detail features and operations of the food preparation display system 12. In some embodiments, some or all of these features and operations can be used in connection with the principles of the present teachings. It should be understood that each of the noted features and operations are not required in every application and use.

Usability of System by Operator

In some embodiments, there is only one graphical user interface end point for the entire application; combining configuration, management and operations into one single console output. In some embodiments, the entire application's user interface is 100% touch operated and does not depend on the availability of keyboard and mouse. However, in some embodiments, the application's user interface elements flow can be structured from top-down and left-right direction in order to speed up user interface recognition.

In order for kitchen staff to recognize user interfaces faster in the busy kitchen environment, as well as having the need to keep the user interface languages as neutral as possible; the use of graphical icons instead of text captions for screen elements is preferred when possible. In this way, users would simply recognize the purpose of the element based on the graphical representation instead. The benefit of this approach should help reduce screen clutter as well as speed up new user training.

In some embodiments, simple yet eye catching colors should be used on user interface screen elements when certain event alerts are triggered. This allows the user base to be alerted of events that need their immediate attention. When Alert is toggled off, then screen element should revert back to normal background colors.

In order to reduce training, speed up operations, and enable easier interface interaction; the application should be designed with single form (window) user interface concept in mind. This concept reduces new user confusion by reducing unnecessary screen pop-ups. This concept also enhances usability by allowing users to view all monitored products on one single screen without manually scrolling.

Tracking of Sales

The point-of-sale system 14 and food preparation display system 12 are tightly integrated so that every time a new point-of-sale system 14 transaction is created and settled at the point-of-sale system 14, the entire order transaction (including the line details) will be sent into the food preparation display system 12 integration services so that such details are tracked and its product mix availability would be depleted accordingly. Accurate tracking of historical product mix sales details is beneficial in giving the ability to correctly forecast future productions. In some embodiments, the food preparation display system 12 should be able to record transactional details based on date and time along with crucial field elements needed by the food preparation display system 12 forecaster system.

If point-of-sale system 14 sales transaction was voided before product consumption, then such point-of-sale system 14 sales transaction void details will be sent into the food preparation display system 12 to be tracked as cancelled transaction. If point-of-sale system 14 sales transaction was voided and product consumption had occurred, then such point-of-sale system 14 sales transaction void details will be sent into the food preparation display system 12 to be tracked as waste.

In order to derive meaningful production estimates, there will be a need to relate certain dates to special events. For example, a specific business date might overlap with one or more of the following special event examples: Severe Weather Conditions; Extremely Hot Weather Conditions (might affect pizza sales); Special Major Sporting Events; Negatively Impacted Major Holidays; Positive Impacted Major Holidays; Special Store Promotions; and more. (user defined) Special events are significant during forecasting because such business date's sales history of point-of-sale system 14 might be inflated or deflated and could cause irregularity for accurately projecting production values for a normal non special event business date in the future. Therefore, it is desirable for the application to have means to create customized special event conditions and register it with specific business dates. In this way, the application will be able to include, exclude or exclusively use the corresponding historical values when attempting to generate meaning and realistic production forecasts.

Often the point-of-sale system 14 will contain a combo product item such as "Party Super Pack" that may be composed of 2 Pepperoni Pizza and 2 Liters of Soda. In this scenario, the point-of-sale system 14 would only track the sale of the combo product item rather than the individual components of the combo. Therefore, in order for the food preparation display system 12 to accurately track the product availability, it must be able to track the individual component products involved rather than the combo product itself. This is where point-of-sale system 14 Combo Breakdown occurs at the food preparation display system 12. Basically, the food preparation display system 12 service process needs to determine if the inbound product is a combo, and if so, it must retrieve the combo definition from food preparation display system 12 product mix and track the individual product components individually.

Although the food preparation display system 12 only needs to monitor certain products designated as Hot-N-Ready®, in some embodiments, the system would track all product sales coming from the point-of-sale system 14 in order to anticipate future changes to the product mix that could include such items in forecasting.

Throughout the business day, there might be situations where certain products might not be readily available for immediate fulfillment. Such scenarios need to be tracked along with normal product depletion, since these scenarios give store managers the ability to perform product forecast gap analysis. Such tracking is beneficial for the purpose of identifying under forecasts as well as discovering new specialty products that could be sold as Hot-N-Ready® in the future. The ideal method of such tracking would be to tag the related product depletion records as not immediately fulfilled, and likewise store how long the actual fulfillment process took (how long the customer had to wait). Internally in the food preparation display system 12, if a fulfillment request cannot be accomplished, then the food preparation display system 12 would simply wait until the production is complete before marking the fulfillment as completed. For premade products, this would be simple to accomplish as the food preparation display system 12 simply finalizes the fulfillment records once the production replenishment process is triggered. For custom products, the food preparation display system 12 would need to assume the preparation, cook and finalize time required and automatically close out the entry by recording the estimated fulfillment time.

Tracking of Losses

Non-Saleable Quality Tracking

For the purpose the food preparation display system 12, "non-saleable quality" will refer to the event of retiring a product because of its shelf life had expired. Additionally, "non-saleable quality" also refers to external factors that caused the product to rapidly expire due to alternative reasons such as improper temperature control. Non-saleable quality tracking affects future product forecasts because non-saleable quality typically indicates a gap in the projection process. Such gap indicates that the projection might be too overly optimistic and hence the gap would need to be factored into future forecasts in order to achieve more accurate results. All non-saleable quality tracking will record the date, time, product involved so that such non-saleable quality details would be factored in production forecasts.

Tracking of Waste

For the purpose of food preparation display system 12, "waste" refers to the event of product loss due to any of the waste tracking reasons mentioned herein. Waste tracking affects future product forecasts because waste typically needs to cancel out current production on hand values in order to derive more meaningful forecast figures in the future. All waste tracking will record the date, time, waste type, product involved so that such waste details would be factored in production forecasts.

In some cases, waste is associated with product damage during the preparation stage prior to cooking. Most likely cause of such scenario would be in the event that the kitchen staff accidentally damaged the product. In some cases, waste is associated with product damage during the cooking stage. Most likely cause of such scenario would be in the event that the product was over cooked or under cooked and therefore becomes non consumable. In some cases, waste is associated with product gone missing while stored on the ready rack awaiting to be cooked and unaccounted for. This is usually an indication of theft or simply a user forgetting to mark the products as cooked when those products were placed into the cooking oven. In some cases, waste is associated with product gone missing while stored in the warmer waiting for customer to purchase. This is usually an indication of theft or simply a user forgetting to mark the products as non-saleable quality when product quality expired.

In some cases, waste is associated with product that was created not according to specification. Hence such product cannot be sold to customer and must now be tracked as waste. In some cases, waste is associated with product that was returned by customer due to dissatisfaction of various reasons. Typically this indicates product quality issues and hence a review of product quality assurance process is warranted.

Still further, in some cases, waste is associated with product that was already made but subsequently the order was voided. This usually refers to custom made to order products. Finally, in some cases, waste is associated with product that was damaged/destroyed due to the warmer device temperature malfunction. This loss should not be counted as part of business day's product depletions for the purpose of forecasting.

Tracking of Overage

For the purpose the food preparation display system 12, "overage" will refer to the event of retiring a product because of end of day. This indicates that there were more products available at end of day that must be classified as overage and thus resulted as loss. Overage tracking affects future product forecasts because overage typically indicates a gap in the projection process. Such gap indicates that the projection might be too overly optimistic and hence the gap would need to be factored into future forecasts in order to achieve more accurate results. All overage tracking will record the date, time, product involved so that such non-saleable quality details would be factored in production forecasts.

At the end of the business day, any excessive prepared pizza on the ready rack and/or holding warmers and non pizza product can be tracked as "Overage". This assumption is accurate because most food product can not be stored overnight for next day reuse.

Production Forecasting

Production forecasting allows the kitchen staff to know exactly what products and what quantity to prepare and cook based on the current time block, as well as factoring the current products already on the ready racks and Warmers so that optimal product availability could be achieved. Stores separate forecasting into four distinct product groups: the prepared pizza group, the prepared bread group, the cooked pizza group, and non pizza product group. Each of these groups serves a key role in ensuring product availability.

Forecasting uses the sales tracking and loss tracking data extensively in order to achieve an optimal and meaningful projection for the current business date and current time block. The forecasting process reviews historical data for the same day of week in prior weeks (Store customizable option in term of number of history weeks). Unless the current business date contains the same special event association, any prior weeks' business dates with non related special events are removed in order to avoid artificial inflation or deflation of business activities that might not be relevant to the current business date.

In order to properly forecast production, there should be sufficient historical tracking of production into what time blocks; depletion originated from what time blocks; loss originated from what time blocks; shortage originated from what time block; and other crucial supplemental data that would help food preparation display system 12 properly analyze the same.

For pizza and bread products, prepared pizza/bread is the first stage in pizza/bread forecasting. All pizza and bread products must be prepared first, then stored on the ready rack waiting to be cooked. The production forecasting will attempt to estimate the total number of various pizza/bread types that need to be prepared and stored onto the ready rack on hourly basis. This of course would factor the existing prepared pizza/bread already on ready racks not yet expired, any products already used for production, and any loss tracking factors. (The forecast is refreshed every minute to detect existing product expirations and usages so that forecast can be updated accordingly) Any time prepared pizza/bread is placed into the cooking oven, the associated quantity would be reduced from available queue. This would update the forecast accordingly as well.

For pizza and bread products, cooked pizza/bread is the second stage in pizza/bread forecasting. All pizza and bread products must be prepared first, then cooked and waiting for customer purchase. Pizza/bread products always remove existing quantity from prepared pizza/bread respectively. Hence any time cooked pizza/bread production is invoked; the related quantity is reduced from the prepared pizza/bread.

The cooked pizza/bread forecast will attempt to estimate the total number of various pizza/bread types that need to be in the warmer on half hourly basis. This of course would factor the existing cooked pizza/bread already in the warmers not yet expired, any product already sold during current time block and any loss tracking factors. (The forecast is refreshed every minute to detect existing product expirations and usages so that forecast can be updated accordingly).

Any time cooked pizza/bread is sold to customer (via point-of-sale system 14 sales tracking), the associated quantity would be reduced from available queue. If it is not currently available, then the item would be reduced when production completes. This event would trigger the shortage tracking. This would update the forecast accordingly as well. Lastly, once the prepared pizza/bread is placed onto the oven belt, the food preparation display system 12 will automatically assume such product is going to be in the warmer after a predefined cook/cut time for each product. Additionally, the estimated finish time is used to calculate this batch of product's expire time. This saves the landing staff from having to use the food preparation display system 12 again.

For wing products, there is only one stage in forecasting. The forecasting basically indicates the product and quantity to cook and then place into the corresponding warmers. Wing products forecast will attempt to estimate the total number of various wing product types that need to be in the holding warmer on half hourly basis. This of course would factor the existing cooked wing products already in the Warmers not yet expired, any product already sold during current time block and any loss tracking factors. (The forecast is refreshed every minute to detect existing product expirations and usages so that forecast can be updated accordingly). Any time wing products are sold to customer (via point-of-sale system 14 sales tracking); the associated quantity would be reduced from available queue. If it is not currently available, then the item would be reduced when production completes. This event would trigger shortage tracking. This would update the forecast accordingly as well. Lastly, once the wing products is placed onto the oven belt, the food preparation display system 12 will automatically assume such product is going to be in the warmer after a predefined cook/box time for each product. Additionally, the estimated finish time is used to calculate this batch of product's expire time.

Food Production

Production may refer to pizza preparation, bread preparation, pizza cooking, bread cooking, and wing product cooking. Any time the kitchen staff performs the task of production, its associated task should be tracked in the food preparation display system 12 in order to adhere to the automated work flow. A production activity basically acts upon the forecast result. Therefore, the kitchen staff utilizes the forecast information to determine what products and quantity will be involved in the production. The kitchen staff is reactive to the food preparation display system 12's alert system, so that once a threshold level is hit for each product, further production can be triggered. This saves the kitchen staff having to focus on the availability and instead allows them to focus on other kitchen duties instead.

Before discussing production in detail, we will first need to identify the concept of warmers (may also be referred to as holding warmers). Warmers are basically product staging queue that keeps the product warm until customer purchase. For the stores, there could be multiple warmer types and multiple warmer devices per each type. However, the pizza warmer would be a required component that will always exist in the presently described stores. However, in other food sale stores, alternative components may exist.

In the present embodiment, a typical store will have at least one pizza warmer; at least one bread warmer; and at least one wing warmer. The bread and wing warmers might be combined into one unit for smaller stores, or these devices may contain other non pizza products as well. In order to keep the food preparation display system 12 flexible, the application should allow each store to identify its own warmer devices and associate with hard coded warmer types of "pizza warmer", "bread warmer" or "wing warmer".

When prepared pizza/bread products of various pizza/bread types are replenished and placed onto the ready rack, the kitchen staff would input the product type and quantity produced into the food preparation display system 12. The food preparation display system 12 would subsequently return a shelf life expire time so that the kitchen staff can record onto the ready rack rail as described in prior sections. Each pizza/bread type has its own specific prepared pizza shelf life and would create the automatic shelf life value accordingly. This method of tracking would significantly reduce the guess work of shelf life and enable the food preparation display system 12 to automatically track existing product expiration.

When cooked pizza/bread products of various pizza/bread types are replenished and placed onto the oven belt, the kitchen staff would input the product type and quantity produced into the food preparation display system 12. The food preparation display system 12 would subsequently estimate the expiration time of the batch of products currently being cooked based on the products' cook/cut time. When the estimated cook/cut time passes, it is assumed that the pizza/bread is now in the warmer and therefore the food preparation display system 12 will set the expiration time for the product lot according to the warmer storage time. This saves the landing staff time by allowing him to focus on cut and box only. (In some embodiments, the landing staff would still mark the expiration time on the finished product, but since the estimated cook/box time is usually in line with the actual, the food preparation display system 12 will still be able to alert the kitchen staff such expirations and allow kitchen staff to find the associated products. It should be appreciated that in some embodiments, a label printer could be used in the landing area and could output a label indicating expiration time, production time, and/or other desired property that could be placed on the box, thereby eliminating the need to handwrite on the box. Moreover, it should be appreciated that other indicia, such as bar codes or other monikers, RFID tags, etc., could be use to track movement and/or population of product.)

Each pizza/bread type has its own specific cooked pizza/bread shelf life and would create the automatic shelf life value accordingly. This method of tracking would significantly reduce the guess work of shelf life and enable the food preparation display system 12 to automatically track existing product expiration. Each pizza/bread type also has cook and finalize time duration associated, and is used to estimate when the products might be ready and add into the availability queue, this is typically 6 minutes for pizza products and 4 minutes for bread products.

Wing Product Replenishment

When wing products types are replenished and placed onto the oven belt, the kitchen staff would input the product type and quantity produced into the food preparation display system 12. The food preparation display system 12 would subsequently estimate the expiration time of the batch of products currently being cooked based on the products' cook/box time. When the estimated cook/box time passes, it is assumed that the wing products is now in the warmer and therefore the food preparation display system 12 will set the expiration time for the product lot according to the warmer storage time. This saves the landing staff time by allowing him to focus on cut and box only. (The landing staff would still mark the expiration time on the finished product, but since the estimated cook/box time is usually in line with the actual, the food preparation display system 12 will still be able to alert the kitchen staff such expirations and allow kitchen staff to find the associated products). Each wing products has its own specific shelf life and would create the automatic shelf life value accordingly. This method of tracking would significantly reduce the guess work of shelf life and enable the food preparation display system 12 to automatically track existing product expiration. Each wing products also has cook and box time duration associated, and is used to estimate when the products might be ready and add into the availability queue.

Availability

Product availability is one of the primary goals of the food preparation display system 12. It allows the store to always have ideal quantity of products available for sale and thus keeping up the promise of 30 second turn around time for a customer visit. The food preparation display system 12's availability would simply inform all parties the current availability figures of premade products at the store. Such availability information can also be supplied to the digital menu board system 16 for special promotions as illustrated in FIGS. 7A-7F. The digital menu board system 16 can be configured, as illustrated in FIGS. 7A-7F, in any one of a number of mutually-exclusive or co-existing layouts that reflect the currently available saleable products. Each saleable product could be showcased with concurrently running video promotion, dynamic attention-getters (i.e. flames around a newly added item or one whose price has decreased, etc.), or other methods for drawings a customer's attention.

The availability information for prepared pizza/bread product would show forecast current time block, forecast remainder quantity, actual quantity on hand, and next product batch expiration time. The availability information for cooked pizza product would show forecast current time block, forecast remainder quantity, actual quantity on hand, and next product batch expiration time. The availability information for non pizza product would show forecast current time block, forecast remainder quantity, actual quantity on hand, and next product batch expiration time.

A promotion trigger to digital menu board system 16 can comprise food preparation display system 12 informing the digital menu board system 16 that a specific product needs to receive extra attention during media presentation, such extra attention can include the use of animation to alert a customer of a product (i.e. steaming animation of warm pizza product or any other attention-grabbing promotion). Situation one of this promo would be one or more products tagged as participating in the digital menu board system 16 promo and need to trigger such event for certain day/time of the week. Situation two of this promo would be the emphasis of trying to focus on one or more of products that might have excess on hand quantity. In this situation, such products will be tagged as participating in the digital menu board system 16 promo and need to trigger such event when the product on hand quantity is near certain time threshold (minutes) before expiration and that its underlying quantity is at or above the quantity threshold. The delivery of the promotion trigger is alerted during normal digital menu board system 16 to food preparation display system 12 synchronizations.

Each product may have availability threshold warning levels to visually alert kitchen staff set individually. If not set, the maximum forecast is assumed as the threshold. Product availability threshold warning levels should contain three monitored stages. Such stages would be "optimal," "low," and "replenish". A level of "optimal" can indicate that quantity on hand is in line with expectation and no warning alerts will appear. The color used for the screen element would simply be its normal background color. A level of "low" can indicate that the kitchen staff should pay attention to the product. It does not necessarily mean that the product must be replenished now, but gives a heads up purpose in preplanning. Typically, this status could be represented as yellow color for the screen element. A level of "replenish" can indicate that the kitchen staff should replenish the product now. It means that the product is below the minimum threshold level and that it might be running out soon. Typically, this status could be represented as red color for the screen element.

In the event that the remainder forecast product quantity for the current time block exceeds the threshold level and that the current on hand quantity falls below one of the monitored threshold levels; in this case, then the remainder forecast product quantity will be used as the alert replenish value. In the event that the remainder forecast product quantity for the current time block is less than the threshold level and that the current on hand quantity falls below one of the monitored threshold levels; in this case, then the alert to replenish will contain the lesser of the different between on hand quantity versus corresponding threshold level, or the remainder forecast product quantity. If the remainder forecast product quantity is zero, then no alerts need to be triggered unless the product setting calls for "forced quantity threshold warning level alert," which would invoke the alert regardless of forecast and always use "ideal replenish quantity" field instead. (forecast still may co-exist)

Quality Assurance

A key success to customer satisfaction is to maintain excellent product quality. Proper quality assurance enables stores to maintain and deliver consistent product quality time after time. The food preparation display system 12 should be able to automate the quality assurance monitoring process so that the role of store employees on quality assurance is minimized to only physical handling of the expired products.

The automated quality assurance monitoring process would internally monitor each product types on hand quantity as well as its associated expiration time. Each product type, quantity and associated expiration time is constructed as a product lot. The product lot is reduced each time product reductions occur, such as point-of-sale system 14 sales, waste, non-saleable quality and other similar reduction triggers. The automated quality assurance monitoring process actively monitors the remaining product quantity on hand and compares the current time with the product lots' expiration time once every minute. When there are product lot with on hand quantity expired, then such product lot expiration will be notified to the kitchen staff via food preparation display system 12's user interface using special color coded alerts. The product lot expiration alert will include the product type, the product expiration time and the expected quantity to retire. Once the store employee is notified of the product lot expiration, the employee will simply use the product type and product lot expiration time to locate the expired products from warmers or ready racks, where applicable. The employee uses the product lot expire quantity to verified if all of the expired products have been removed from current availability queue. Once the employee has removed the expired product lot, the employee would simply acknowledge the removal of such product lots on the food preparation display system 12 and record the loss as non-saleable quality, waste or overage, whichever is applicable.

For prepared pizza/bread products quality assurance, the food preparation display system 12 actively monitors the currently available product lots' quantity stored on one of the ready racks and its expected expiration time. The expiration of the prepared pizza/bread products is validated every minute between the current time and the product lots' expiration time. When the expiration is discovered, then the visual alert to the kitchen staff via food preparation display system 12's user interface will contain "product type," "storage location (pizza/bread ready rack)," "expiration time," "expired product quantity count," as well as the use of bright color to increase awareness of the alert. The kitchen staff being notified of the alert will subsequently carry out the physical action of locating the product types that have expired based on the alert's product type, storage type, the expiration time and the expired product quantity count. Once the kitchen staff completes the physical removal of the expired products, the kitchen staff would then simply invoke a command on the food preparation display system 12 to clear the alert and associate the removed products with a corresponding loss type such as non-saleable quality, waste reason or overage.

For cooked pizza products quality assurance, the food preparation display system 12 actively monitors the currently available product lots' quantity stored in one of the pizza warmers and its expected expiration time. The expiration of the cooked pizza products is validated every minute between the current time and the product lots' expiration time. when the expiration is discovered, then the visual alert to the kitchen staff via food preparation display system 12's user interface will contain "product type," "storage location (pizza warmer)," "expiration time," "expired product quantity count," as well as the use of bright color to increase awareness of the alert. The kitchen staff being notified of the alert will subsequently carry out the physical action of locating the product types that have expired based on the alert's product type, storage type, the expiration time and the expired product quantity count. Note that the product expiration time was already marked on the pizza box during production stage; therefore, matching the expiration time of the alert with actual product should be a simple matter. Once the kitchen staff completes the physical removal of the expired products, the kitchen staff would then simply invoke a command on the food preparation display system 12 to clear the alert and associate the removed products with a corresponding loss type such as non-saleable quality, waste reason or overage.

For non pizza products quality assurance, the food preparation display system 12 actively monitors the currently available product lots' quantity stored in one of the non pizza warmers and its expected expiration time. The expiration of the non pizza products is validated every minute between the current time and the product lots' expiration time. when the expiration is discovered, then the visual alert to the kitchen staff via food preparation display system 12's user interface will contain "product type," "storage location (bread/wing warmers)," "expiration time," "expired product quantity count," as well as the use of bright color to increase awareness of the alert. The kitchen staff being notified of the alert will subsequently carry out the physical action of locating the product types that have expired based on the alert's product type, storage type, the expiration time and the expired product quantity count. Note that the product expiration time was already marked on the product box/bag during production stage; therefore, matching the expiration time of the alert with actual product should be a simple matter. Once the kitchen staff completes the physical removal of the expired products, the kitchen staff would then simply invoke a command on the food preparation display system 12 to clear the alert and associate the removed products with a corresponding loss type such as non-saleable quality, waste reason or overage.

as discussed above, the product expired warning alert needs to be especially attention grabbing in order for the kitchen staff to follow through with the necessary quality assurance work process. The ideal method of such attention alerts will use the combination of bright color and flashing of the screen element and/or audible alerts.

Integrations

In order for the point-of-sale system 14, digital menu board system 16 and food preparation display system 12 to function as a unified product system 10 where all system interactions between the three systems are seamless and cohesive, a set of predefined integration interface protocols need to be defined and adopted by all technology parties involved. The first integration layer is between the point-of-sale system 14 and the food preparation display system 12. This integration allows the point-of-sale system 14 and food preparation display system 12 to interact with each other in order to send point-of-sale system 14 transactions and voids from point-of-sale system 14 into the food preparation display system 12; to enable bi-directional transfer of point-of-sale system 14 product mix between the point-of-sale system 14 and the food preparation display system 12. The second integration layer is between the digital menu board system 16 and the food preparation display system 12. This integration allows the digital menu board system 16 and food preparation display system 12 to interact with each other in order to allow the digital menu board system 16 to query current product mix and availability as well as promo triggers from the food preparation display system 12; to allow the digital menu board system 16 to inform the food preparation display system 12 of new product mix to use in place of existing ones. (In this event, the food preparation display system 12 will update local product mix once received from digital menu board system 16, and then subsequently update the point-of-sale system 14 accordingly as well).

The ability to perform product mix download from point-of-sale system 14 is a function of the first integration layer described herein. This capability allows the food preparation display system 12 to query the point-of-sale system 14 product mix directly from the integrated point-of-sale system 14. The purpose of this capability is to allow the food preparation display system 12 to be rapidly setup without having to re-enter product mix details a second time. Additionally, this capability allows the food preparation display system 12 to refresh point-of-sale system 14 product mix whenever point-of-sale system 14 Product Mix changes. (user triggered from point-of-sale system 14).

In some embodiments, the integration interface is as follows: 1) The food preparation display system 12 is configured with the target point-of-sale system 14 database's full path. 2) When the user invokes a command on the food preparation display system 12 to retrieve the point-of-sale system 14 product mix, internal work process will connect and query the point-of-sale system 14 database directly and retrieve the necessary product mix details from the point-of-sale system 14 into the food preparation display system 12 for processing. 3) This process is repeated any time the point-of-sale system 14 had changes to the product mix or if the user of the food preparation display system 12 needs to manually refresh the point-of-sale system 14 product mix.

The ability to allow product mix download from digital menu board system 16 is a function of the second integration layer described herein. This capability allows the digital menu board system 16 update the food preparation display system 12 with regard to new or revised product mixes and subsequently merges such product mix changes into the point-of-sale system 14 as well. The purpose of this capability is to allow a corporate presence update the product mix (such as product addition, product changes, product deletions, and price changes) into individual store locations. Additionally, if a CD of product mix was shipped to the store, then such content import will occur at local store, and does not change the interface used by the food preparation display system 12. For the food preparation display system 12, the integration of product mix from the corporate presence is unified and does not change for the food preparation display system 12.

In some embodiments, the integration interface is as follows. However, please note that the following description describes an optional interface technique that can be varied: 1) The food preparation display system 12 exposes an ASP-.NET web service that will allow digital menu board system 16 to invoke; 2) The digital menu board system 16 synchronizes with the food preparation display system 12 via the above ASP.NET web service every 30 seconds; 3) If there is a product mix that needs to be pushed into the food preparation display system 12 during the above synchronization run, then digital menu board system 16 will invoke a specialized web method on the food preparation display system 12's ASP.NET web service and deliver such product mix directly into the food preparation display system 12; 4) When the food preparation display system 12 receives the product mix update from digital menu board system 16, the food preparation display system 12 will trigger transformation code logic so that the new product mix is merged with old product mix and any replacements or modifications will be persisted. Once the food preparation display system 12 completes the import process, the finalized changes will also be sent into the point-of-sale system 14 for merger as well. (The digital menu board system 16 should be allowed to set a date and time of when the product mix import shall take place).

The ability to allow product mix and availability information queried by the digital menu board system 16 is a function of the second integration layer described herein. This capability allows the digital menu board system 16 to retrieve current product mix and availability from the food preparation display system 12 by invoking the food preparation display system 12's ASP.NET web services.

The purpose of this capability is to allow seamless retrieval of current product mix and availability directly from the food preparation display system 12 in near real time so that such offerings and promos may be constructed by the digital menu board system 16 to alert customers of product availabilities. In this scheme, the digital menu board system 16 will always be the consumer of the ASP.NET web service while the food preparation display system 12 will always the be host of the corresponding ASP.NET web service.

The integration interface is as follows: 1) The food preparation display system 12 exposes an ASP.NET web service that'll allow digital menu board system 16 to invoke. This ASP.NET web service will serve as the bridge between the digital menu board system 16 and food preparation display system 12; 2) The digital menu board system 16 synchronizes with the food preparation display system 12 via the above ASP.NET web service every 30 seconds; 3) During this synchronization process, the digital menu board system 16 should invoke the specialized web service designed for the purpose of product mix and availability retrieval from the food preparation display system 12; 4) When the food preparation display system 12 ASP.NET replies to the digital menu board system 16 with the product mix and availability, if there are any special promotion triggers that need to notify the digital menu board system 16, such triggers will also be delivered in the same packet as well; and 5) When the digital menu board system 16 receives the product mix and availability information, the digital menu board system 16 will initiate internal processing work with the newly acquired data from the food preparation display system 12.

The ability to upload the food preparation display system 12 product mix to the point-of-sale system 14 is a function of the first integration layer described herein. This capability allows the latest version of the product mix from the food preparation display system 12 to reverse update into the point-of-sale system 14 by directly writing into the point-of-sale system 14 database from the food preparation display system 12 work process. The purpose of this capability is to allow seamless point-of-sale system 14 update of any changes to the product mix that might have occurred on the food preparation display system 12 itself. Situation such as prices changes on the food preparation display system 12 or revised product mix from the digital menu board system 16 causes the food preparation display system 12 to contain a new set of product mix used by the store, therefore, it is important to enable such reverse update of point-of-sale system 14 product mix into the point-of-sale system 14 whenever such synchronization is needed. The trigger for this reverse update to point-of-sale system 14 can be user triggered or automated. User triggered is always an option from the food preparation display system 12 user interface. Automated trigger is performed whenever a product mix update was received from the digital menu board system 16 and that merge action effective date/time has reached. Another automatic trigger is when the product prices were updated on the food preparation display system 12 directly and upon data save action, the reverse update should be performed.

The integration interface is as follows: 1) Either an user manually triggers the food preparation display system 12 upload of product mix into the point-of-sale system 14, or such action was auto triggered due to situation described in the above section; 2) Once the trigger occurs, the food preparation display system 12 connects to the underlying point-of-sale system 14 database directly and starts the merge action; 3) The latest product mix from the food preparation display system 12 (potentially a subset only) will be merged into the point-of-sale system 14 database and any changes from the food preparation display system 12 will be persisted onto the point-of-sale system 14 database; 4) Any deleted or added products from the food preparation display system 12 will also be updated into the point-of-sale system 14 as well; and 5) Any combo component product from the food preparation display system 12 will not be involved in the merger since such items do not typically appear in the point-of-sale system 14.

The ability to allow point-of-sale system 14 transactions and voids to be posted into the food preparation display system 12 is a function of the first integration layer described herein. This capability allows the point-of-sale system 14 to post point-of-sale system 14 transactions and voids with line details into the food preparation display system 12 via the food preparation display system 12's ASP.NET web services. The purpose of this capability is to allow seamless integration of point-of-sale system 14 transactions and voids directly from the point-of-sale system 14 into the food preparation display system 12 in real time using the food preparation display system 12's ASP.NET web services. In this scheme, the point-of-sale system 14 will always be the consumer of the ASP.NET web service while the food preparation display system 12 will always be the host of the corresponding ASP-.NET web service.

In terms of the point-of-sale system 14 transaction voids, if such a void was generated before product consumption (no waste), then the food preparation display system 12 will simply record such void as a cancellation of product depletion in the food preparation display system 12. If such void was generated after product consumption (waste occurred), then the corresponding waste reason along with special tag will be set for the product depletion to indicate waste tracking. Likewise, such event will not participate in future forecasting since waste is not a anticipated recurring factor in business operations.

The integration interface is as follows: 1) The food preparation display system 12 exposes an ASP.NET web service that'll allow point-of-sale system 14 to invoke. This ASP.NET web service will serve as the bridge between the point-of-sale system 14 and food preparation display system 12; 2) The point-of-sale system 14 will post the new point-of-sale system 14 transaction or void into the food preparation display system 12 with line details for all non notified line items; 3) The point-of-sale system 14 will not post existing line items already notified to the food preparation display system 12 during re-submit in case of item additions to the order (this prevents double or triple reductions); 4) When the food preparation display system 12 receives the post data, the food preparation display system 12 will process the input data and record such transactions into its own local data store accordingly; and 5) point-of-sale system 14 sales transaction line details (all non notified lines) will be recorded as product depletions; point-of-sale system 14 void transaction line details (all non notified lines) will be recorded as product depletion cancellations, and if waste occurred, it will be recorded as waste with waste reason accordingly.

Management

The food preparation display system 12 contains certain functions that are categorized as management focused. This means that normal operating users shall not have such access. This also means that such functions will be password protected for authorized personnel only. All management functionalities shall be grouped together and one login will unlock all associated management capabilities. The following sections discuss the management areas related to the food preparation display system 12.

In order to access any features under the management category, the user must login to the management screen element before management function interface will be displayed. The login process should be simple and fast. Therefore, the use of numeric access code only authentication (as oppose to user name and password authentication) is preferred.

Once a management user is logged in to the management screen elements, the user may then add, edit, or delete management user account. Management user account is contains the account name, access code and potentially other information necessary for the purpose of authentication. Non management functions do not require user authentication.

Once a user logged in to the management screen elements, one of the available feature is the food preparation display system 12 system configuration. This feature allows the user to configure certain key settings in order for the food preparation display system 12 to operate. Specifically, the point-of-sale system 14 database full path is a key setting that must be filled out after initial setup or anytime point-of-sale system 14 database moves to a different location (not very often). All system configuration data are stored in the local data store of the food preparation display system 12.

Once a user is logged in to the management screen elements, one of the available feature is the food preparation display system 12 product mix configuration. In some embodiments, this is actually a required work flow when the system goes online for the first time. This is because the food preparation display system 12 must first retrieve all point-of-sale system 14 product mix from the point-of-sale system 14 and then allow the management user to selective or choose which products will participate in the food preparation display system 12 and then fine tune the extended details accordingly.

The retrieval of the point-of-sale system 14 product mix is achieved via the point-of-sale system 14 integration and has been discussed herein.

The configured food preparation display system 12 product mix will be stored in the food preparation display system 12 data store and becomes the products used by the food preparation display system 12. Non monitored products will still be stored in the food preparation display system 12 but will not involve in production, availability and quality assurance.

Once a management user is logged in to the management screen, several reports become available for on screen viewing and printing to the desktop format printer. The product mix sales history report available in the food preparation display system 12 shows detailed product mix sales broken down into half hour or hourly filters. The information on this report will show the product name, the time block involved, the quantity involved, and the revenue involved. The loss tracking history report available in the food preparation display system 12 shows detailed product losses due to nonsaleable quality, waste and overages, and is broken down into half hour or hourly filters. The information on this report will show the product name, the time block involved, the quantity involved, and the revenue involved. Additionally, for waste event types, the waste reason is also associated in this report as well. The product forecast report available in the food preparation display system 12 shows the entire day's production forecast broken into hourly and half hourly time blocks per a specific business date. This report should contain the product name, the quantity expected to produce for prepared pizza (if applicable), the quantity expected to produce for cooked products, all grouped under hourly and half hourly time blocks where applicable. The product forecast gap analysis report available in the food preparation display system 12 shows the management user any product availability not kept in line with demand; products might not be on premade list but might need to; as well as any excess forecasts. A food preparation display system 12 overview report serves as a global overview of all related report data in a summary format for quick understanding of operations. In this report, the product mix sales history; the product lost tracking; the product forecast; the product forecast gap analysis are all summarized into one single report and grouped into hourly and half hourly time blocks where applicable. Additionally, historical results from prior weeks for the same week day are also summarized as well. Option is also given to summarize such prior weeks' results Operation The following describes in detail the operation by a user of the food preparation display system 12, as well as providing a generalized outline of point-of-sale system 14 and digital menu board system 16 usages as related to the food preparation display system 12.

Operations During Business Day

Every day when the food preparation display system 12 is started for the first time, the initial quantity will be zero for all products. This is because at the end of the day, all excessive products are discarded and marked as overage. Products must be made fresh daily. Therefore, after the initial daily system startup, the food preparation display system 12 will always alert the kitchen staff of product availability requires immediate replenishment.

The following is the work flow for initial daily startup availability: 1) Users will notice a product availability needs immediate replenishment alert displayed on the food preparation display system 12 screen; 2) Users will immediately act upon this alert by producing the product and its quantity as suggested by the alert; 3) Once the production is complete, the users will then invoke a food preparation display system 12 command to increment the product quantity and hence the alert will disappear automatically or the alert will be reduced accordingly if production would not completely cover the shortage; and 4) After the users invoked the production increment action, the food preparation display system 12 will group the quantity of the products as a product lot and associate with an appropriate product expiration time.

Throughout the operations of the day, the product availability might become low. This is a warning to the kitchen staff and that potential preparation work might need to be underway. Typically an alert is distinguished by a different color code legend.

The following is the work flow for product availability low alert: 1) Users will notice a product availability low alert displayed on the food preparation display system 12 screen. This alert is not as prominent as the product availability need replenishment alert; 2) Users will view this as a warning and depending on current operating situations, decide to ignore the warning; start preparations; or start production accordingly; 3) If Users start preparation (pre-planning rather than production), then such action does not need to be tracked by the food preparation display system 12; and 4) If Users start production (prepared pizza, prepared bread, cook pizza, cook non pizza products), then such action will follow the same work flow as the Production Use Case Scenario.

Throughout the operations of the day, the product availability might become out and need immediate replenishment. This is a critical alert to the kitchen staff and that production should be underway. This alert typically attracts serious attention for immediate action. This alert and its remainder quantity to produce for the current time block is based on forecast as described herein.

The following is a work flow for product availability out alert: 1) Users will notice a product availability out alert displayed on the food preparation display system 12 screen. This alert is very prominent since the products in alert need replenishment immediately if applicable; and 2) Users will view this as a critical alert and production will begin immediately based on the remainder forecast shown.

Throughout the operations of the day, the product availability might become out and need immediate replenishment. This is a critical alert to the kitchen staff and that production should be underway. This alert typically attracts serious attention for immediate action. This alert and its remainder quantity to produce for the current time block is not based on forecast and is intended as a way to manually set warning thresholds.

The following is a work flow for product availability out alert: 1) Users will notice a product availability out alert displayed on the food preparation display system 12 screen. This alert is very prominent since the products in alert need replenishment immediately if applicable. However, since this is manual threshold alert, indicator will be given to inform the users accordingly. The users will decide the proper course of action to take with this alert; and 2) If the users decide the production, then production will commence accordingly for the desired quantity.

When the food preparation display system 12 alerts the kitchen staff that certain products have expired, the alert will contain product, storage type, quantity, and expire time. A kitchen staff will react to this event by executing the following work flow.

The following is the work flow for product quality assurance alert: 1) Kitchen staff is alerted of the product expiration along with the information necessary to locate the products; 2) Based on the provided information from the food preparation display system 12 (kitchen staff can either clear the alert or wait until products are removed), the kitchen staff finds the expired products and finalizes the work flow; and 3) Once the food preparation display system 12 alert is cleared, internally, the food preparation display system 12 tracks such as non-saleable quality for the time block it originated from.

If there were any product mistakes, damages or other non point-of-sale system 14 waste events, then such loss will be tracked directly into the food preparation display system 12 so that future forecasts won't be affected by such situations.

The following is the work flow for product waste tracking: 1) Identified products that need to be tracked as waste is either entered into the food preparation display system 12 by the kitchen staff or the Kitchen Manager (Depending on System Security); and 2) The product, quantity, waste type are all recorded into the system along with the expiration time marked on the packaging in order for the food preparation display system 12 to reverse calculate its original production/creation time block involved. This allows the food preparation display system 12 to properly decrement the depletion in the proper time block.

Generally, the following can occur when a walk-in customer visits and conducts a transaction: 1) The customer arrives to the counter, reviews the digital menu board system 16 and places the order with the store clerk; 2) The store clerk enters the order into the point-of-sale system 14, collects payment; 3) The point-of-sale system 14 sends the special product to the kitchen printer if applicable, and it also sends the point-of-sale system 14 sales transaction to the food preparation display system 12 for processing; 4) The food preparation display system 12 receives the encrypted point-of-sale system 14 sales transaction, processes the data and tracks the depletion accordingly. Availability is immediately reflected, and shortly thereafter, the digital menu board system 16 picks up the latest product mix and availability in order to refresh onto the digital menu board system 16 display; and 5) Once products are ready (Special) or if Hot-N-Ready®, the store clerk finalizes the order with the customer accordingly.

Generally, the following can occur when a walk-in customer visits and a transaction is voided: 1) The customer requests a void of the transaction, or if the store clerk needed to void the point-of-sale system 14 transaction, a store manager is called to approve (if applicable); 2) Once the point-of-sale system 14 transaction is voided, the point-of-sale system 14 sends the void transaction to the food preparation display system 12 for tracking; and 3) The food preparation display system 12 receives the void action and handles it according to the following void logic outlined:

If the point-of-sale system 14 void occurred before products where fulfilled, indicated by "NO WASTE" message from point-of-sale system 14, then the depletion is simply cancelled and availability is replenished accordingly and automatically.

In the case where a transaction was fulfilled and later voided, the returned product should be tracked as a waste type reason inputted directly into the food preparation display system 12 according to section described above. The point-of-sale system 14 void is simply used to cancel out prior transaction. The waste event will keep the products depleted but will remove it from future forecasting.

The key difference between walk-in customers and phoned-in customers is that phoned-in customers will call to place order via telephone and most likely order special pizza products instead. Once the kitchen receives the order, production starts according to the description contained herein. If the phoned-in order is for a large number of Hot-N-Ready® products, then the kitchen staff would simply increase the production to match it, much the similar way as special product in that scenario. In the event that customer did not pick up the phoned-in products that contained special products, then such product does not need to be tracked in the food preparation display system 12 since it does not participate in the automated monitoring of availability.

Conclusion

Overall, the food preparation display system 12 maintains all product mix, prices, transactional history, forecasting as well as quality assurance control processes. The digital menu board system 16 is used as the customer facing presentation layer for the food preparation display system 12. The digital menu board system 16 will not maintain a second set of such data. During product mix synchronization, food preparation display system 12 will provide XML formatted product name, current price, current availability, Core Item status, Optional Item status, Hot-N-Ready® status, and product code.

It should be understood that variations of the present teachings are possible. By way of non-limiting example, in some embodiments, a store's currently saleable inventory may be accessible for viewing and/or purchase from an off-site location, such as at a home or business that has internet connectivity to access such product and pricing information. Purchases could be completed online and picked up or delivered immediately. Additionally, in some embodiments, the present teachings can be used in applications outside of the pizza sale industry and thus can be used generally in any food service industry—such as those offering differing food products (i.e. hamburgers, sandwiches, etc.), differing business plans (i.e. fast food, carryout, etc.) or locations (i.e. cruise ships, amusement parks, and other generally captive purchasing groups)— or other industries outside of food preparation that can benefit from the principles of the present teachings.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A product management and sales system for managing food product preparation and sales, said system comprising:
   a kitchen display and input device displaying a plurality of perishable food items of different varieties to be produced and receiving a production indication signal indicating said plurality of perishable food items that have been prepared;
   a digital menu board displaying the variety of said plurality of perishable food items that have been prepared and are available for immediate sale;
   a sales counter terminal for completing a sale of at least one of said plurality of perishable food items and outputting a sold indication signal of said at least one perishable food items; and
   a controller receiving said sold indication signal, said controller comparing said sold indication signal to a predetermined saleable product inventory level for said at least one perishable food items and outputting an item-to-be-produced signal to said kitchen display and input device, wherein said controller maintains historic information relating to sale of said plurality of perishable food items in connection with a predetermined time frame, said historic information being used to predict future sale needs for said plurality of perishable food items.

2. The system according to claim 1, wherein said controller determines a quantity of said plurality of perishable food items that remains unsold at the conclusion of said predetermined time frame and updates said historic information to indicate overproduction of said plurality of perishable food items.

3. The system according to claim 1, wherein said controller monitors a time between said production indication signal and current time to determine non-saleable quality of each of said plurality of perishable food items.

4. The system according to claim 3, wherein said controller outputs a non-saleable quality signal to said kitchen display and input device when non-saleable quality is determined.

5. The system according to claim 1, wherein said controller further determines a current inventory of said plurality of perishable food items based on said sold indication signal and said production indication signal and, when said current inventory drops to a predetermined level, outputs a display signal to said digital menu board to remove said plurality of perishable food items from said digital menu board.

* * * * *